United States Patent
Ruth et al.

(10) Patent No.: US 6,797,667 B2
(45) Date of Patent: Sep. 28, 2004

(54) PROCESS FOR PREPARING AN ANODE CATALYST FOR FUEL CELLS AND THE ANODE CATALYST PREPARED THEREWITH

(75) Inventors: Karsten Ruth, Alzenau (DE); Peter Biberbach, Rodenbach (DE); Karl-Anton Starz, Rodenbach (DE); Ralph McIntosh, Hanau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 14 days.

(21) Appl. No.: 10/147,719

(22) Filed: May 16, 2002

(65) Prior Publication Data

US 2003/0017378 A1 Jan. 23, 2003

(30) Foreign Application Priority Data

May 23, 2001 (EP) .......................................... 01112536

(51) Int. Cl.$^7$ ........................ B01J 21/18; B01J 23/40; B01J 23/42; H01M 4/86; H01M 4/90
(52) U.S. Cl. ...................... 502/182; 502/185; 502/101; 502/326; 429/40; 429/44
(58) Field of Search ............................... 502/182, 185, 502/101, 326; 429/40, 44

(56) References Cited

U.S. PATENT DOCUMENTS

| | | | | |
|---|---|---|---|---|
| 4,292,197 A | * | 9/1981 | Chamberlin | 252/425.3 |
| 4,299,682 A | * | 11/1981 | Oda et al. | 204/264 |
| 4,425,261 A | * | 1/1984 | Stenius et al. | 502/339 |
| 5,767,036 A | * | 6/1998 | Freund et al. | 502/185 |
| 5,773,162 A | * | 6/1998 | Surampudi et al. | 429/39 |
| 5,800,938 A | * | 9/1998 | Watanabe | 429/30 |
| 6,007,934 A | * | 12/1999 | Auer et al. | 429/44 |
| 6,183,894 B1 | * | 2/2001 | Adzic et al. | 429/13 |
| 6,326,098 B1 | * | 12/2001 | Itoh et al. | 429/40 |
| 2002/0132154 A1 | * | 9/2002 | Adzic et al. | 429/40 |

FOREIGN PATENT DOCUMENTS

| | | | |
|---|---|---|---|
| DE | 198 52 547 | 5/2000 | |
| EP | 0450849 | * 10/1991 | ............ H01M/4/92 |
| EP | 0 880 188 | 11/1998 | |
| EP | 0880188 | * 11/1998 | ............ H01M/4/92 |
| EP | 0 924 784 | 6/1999 | |
| EP | 0924784 | * 6/1999 | ............ H01M/4/92 |
| JP | 60151969 | 10/1985 | |

OTHER PUBLICATIONS

D. Gosselin, European Search Report, Sep. 12, 2002.

* cited by examiner

*Primary Examiner*—Mark L. Bell
*Assistant Examiner*—Patricia L. Hailey
(74) *Attorney, Agent, or Firm*—Kalow & Springut LLP

(57) ABSTRACT

The invention provides a process for preparing a platinum-ruthenium catalyst and the catalyst prepared therewith. The catalyst can be supported on a support material in powder form or may also be unsupported. To prepare the supported catalyst, the support material is suspended in water and the suspension is heated to at most the boiling point. While keeping the temperature of the suspension the same, solutions of hexachloroplatinic acid and ruthenium chloride are then added to the suspension, then the pH of the suspension is increased to a value between 6.5 and 10 by adding an alkaline solution and the noble metals are thus precipitated onto the support material. Afterwards, one or more organic carboxylic acids and/or their salts are added to the suspension and the catalyst is chemically reduced, washed, dried and optionally subsequently calcined under an inert or reducing atmosphere at a temperature between 300 und 1000° C. The catalyst is characterised by a high tolerance to carbon monoxide poisoning in the fuel cell.

14 Claims, 2 Drawing Sheets

PROCESS FOR PREPARING AN ANODE CATALYST FOR FUEL CELLS AND THE ANODE CATALYST PREPARED THEREWITH

FIELD OF INVENTION

The invention provides a platinum-ruthenium catalyst for PEM fuel cells with a high tolerance toward poisoning by carbon monoxide. The catalyst is particularly suitable as an anode catalyst for fuel cells with a polymer electrolyte membrane (PEM fuel cells), but it is also suitable as an anode catalyst for direct methanol fuel cells (DMFC).

BACKGROUND OF INVENTION

In principle, fuel cells are gas-operated batteries in which the energy obtained from the reaction of water and oxygen is converted directly into electrical energy. The present invention describes catalysts for PEM fuel cells (PEM= polymer electrolyte membrane) that are suitable for operation with hydrogen-containing gases or with methanol (DMFC=direct methanol fuel cell). The first-mentioned type of fuel cell is gaining in importance as a source of power for motor vehicles operated by electric engines, due to its high energy density and robustness, the latter type of fuel cell enables a reduction in the number of units required because a hydrogen-producing unit is not needed.

When compared with conventional internal combustion engines, fuel cells have very low emissions and, at the same time, very high efficiency. If hydrogen is used as a fuel gas, water is the only emission on the cathode side of the cell. Motor vehicles with such a drive system are called ZEVs (zero emission vehicles).

Currently, however, hydrogen is still too expensive and causes problems with regard to storage and the refuelling of vehicles. For these reasons, the alternative, producing hydrogen from methanol directly on-board the vehicle, is gaining in importance. The methanol stored in the vehicle tank is either converted into a hydrogen-rich fuel gas with carbon dioxide and carbon monoxide as secondary constituents, in a unit upstream of the fuel cell, or is oxidised directly on the anode of the fuel cell. In the former case, purification steps to react the carbon monoxide by a shift reaction or by preferential oxidation (PROX) are also required. Thus, in theory, the reformate gas consists of only 75 vol.-% hydrogen and 25 vol.-% carbon dioxide. In practice, this gas still contains some nitrogen and, depending on the degree of purification, variable amounts of carbon monoxide (up to 1 vol.-%). In the case of DMFC operation, the methanol is electrochemically oxidised directly on the anode to give carbon dioxide. An intermediate step in the complicated reaction mechanism of the anode reaction leads to adsorbed carbon monoxide, which is then oxidised further to carbon dioxide.

Catalysts based on platinum are used on the anode and cathode sides of PEM fuel cells. These consist of fine noble metal particles that are deposited on a conductive support material (generally carbon black or graphite). The concentration of noble metal is typically between 10 and 80 wt.-%, with respect to the total weight of the catalyst.

Traditional platinum catalysts are very sensitive to poisoning by carbon monoxide. Therefore, the concentration of carbon monoxide in the anode gas needs to be reduced to less than 10 ppm in order to prevent performance losses in the fuel cells due to poisoning of the anode catalyst. This applies in particular to PEM fuel cells which, with low working temperatures of up to 100° C., are especially sensitive to poisoning by carbon monoxide. Even larger problems occur with DMFC systems.

The problem of the poisoning of platinum catalysts by carbon monoxide has been recognised for some time. Due to its special molecular structure, carbon monoxide is adsorbed on the surface of platinum thereby blocking access to the catalytically active centres in the platinum by hydrogen molecules in the anode gas.

It is also known that the tolerance of a platinum catalyst to poisoning by carbon monoxide can be improved by alloying or doping the platinum with other metals, for example ruthenium. Generally, this means that oxidation of the carbon monoxide adsorbed on the platinum to carbon dioxide takes place and the carbon dioxide is then readily desorbed. The oxygen required for this is supplied either in the form of small amounts of air (called an air-bleed in the following) or in bonded form as water in the anode gas stream. The use of an air-bleed leads, in addition to the oxidation of carbon monoxide, to the oxidation of some of the hydrogen, and thus, reduces the efficiency of the overall system. For this reason, catalysts for reduced air-bleed, or even air-bleed-free fuel cell systems are gaining in importance.

EP 0889 188 A2 describes a CO-tolerant PtRu anode catalyst in which the two noble metals are not alloyed with each other. The particle size of the platinum is less than 2 nm, that of the ruthenium is less than 1 nm. The high carbon monoxide tolerance is achieved with an air-bleed of 3 vol.-%. In addition, surface analysis using XPS shows that the ruthenium is present in a largely oxidic form.

DE 197 56 880 A1 describes the use of platinum/ ruthenium alloy catalysts that have a reduced particle size, as compared with conventional catalysts, and thus provide increased carbon monoxide tolerance. However, an air-bleed of 3 vol.-% was also used there. Nothing is disclosed about the carbon monoxide tolerance in the case of reduced air-bleed or air-bleed-free operation. In addition, preparation using the colloids described is costly.

DE 44 43 701 C1 describes the use of monometallic or multimetallic supported catalysts. Here again, preparation requires the use of a prefabricated metal colloid. Nothing is disclosed about use as anode catalysts without an air-bleed.

EP 0 501 930 B1 describes quaternary alloys of platinum, nickel, cobalt and manganese as anode catalysts for phosphoric acid fuel cells (PAFC=phosphoric acid fuel cell), which have a high resistance to carbon monoxide at the high operating temperatures of a phosphoric acid fuel cell, 160° C. to 200° C. The alloy particles have a size of about 3 nm. At the high operating temperatures of the phosphoric acid fuel cell, however, the tendency of carbon monoxide to be adsorbed onto metal surfaces is lower in any case than at the low operating temperatures of a PEM fuel cell.

EP 0 549 543 B1 describes a process for preparing supported catalysts that contain highly disperse metal particles with average particle sizes of less than 2 nm. The process comprises reducing metal ions in a suspension of the support material, using a reducing agent in the presence of carbon monoxide, and simultaneous deposition on the support. The carbon monoxide present is adsorbed on the metal particles being deposited, which hinders further particle growth. After completion of the deposition process, the catalyst is washed and dried at a temperature of less than 100° C. in a reducing atmosphere. The carbon monoxide is thus desorbed. In example 4, the preparation of a platinum/ ruthenium catalyst on carbon with an average particle size for the platinum/ruthenium particles of 1.7 nm is described. However, this catalyst is not an alloy catalyst because adsorption of carbon monoxide on the metal particles during deposition prevents the formation of an alloy. Also, an alloy is not formed as a result of the subsequent thermal treatment at up to 100° C. There is no data provided about the properties of this catalyst when used as an anode catalyst in a PEM fuel cell with a carbon monoxide-containing reformate gas.

Platinum/ruthenium catalysts on various support materials have been commercially available from the E-TEK, Division of DeNora N.A. Inc., 39 Veronica Avenue, Somerset N.J. 08873-6800 (USA) for some time. These are alloyed platinum/ruthenium catalysts with a noble metal loading between 5 and 60 wt.-% and a platinum/ruthenium atomic ratio of 1:1. Tests using a catalyst of this type (40 wt.-% PtRu on Vulcan XC 72) revealed an unsatisfactory tolerance to carbon monoxide, especially at concentrations of carbon monoxide of more than 100 ppm in the anode gas. As shown by surface analysis using XPS spectroscopy, the catalyst contains a considerable proportion of oxidised ruthenium at the surface.

M. Iwase and S. Kawatsu report, in an article, the development of carbon monoxide tolerant anode catalysts (M. Iwase and S. Kawatsu, Electrochemical Society Proceedings, Volume 95-23, p. 12). In this article, the best results were produced with a platinum/ruthenium alloy catalyst in which the alloy was formed by special thermal treatment. Nevertheless, the voltage drop at a current density of 0.4 A/cm$^2$ was still about 200 mV at a carbon monoxide concentration of 100 ppm. This is still far too high for practical operation.

Unsupported platinum/ruthenium catalysts as carbon monoxide tolerant anode catalysts for sulfuric acid fuel cells are described by L. W. Niedrach et al. (J. Electrochemical Techn. 5, 1967, p. 318). These materials consist of fine platinum/ruthenium alloy powders with high specific surface areas. They are prepared by the so-called ADAMS process by melting a mixture of hexachloroplatinic(IV) acid, ruthenium(III) chloride and sodium nitrate at 500° C. However, this method of preparation raises problems with regard to protection of the environment and health (formation of large amounts of nitrous gases, working with liquid, corrosive melts).

Thus, the object of the present invention is to provide platinum-ruthenium catalysts that are characterised by improved tolerance to catalyst poisons, such as carbon monoxide in anode gas, in particular with small or zero air-bleeds. Furthermore, the PtRu catalyst should exhibit a good performance as anode catalysts in DMFCs. The method of preparation according to the invention should be far less damaging to the environment and to health than known processes.

SUMMARY OF INVENTION

The present invention provides a process for preparing an anode catalyst for fuel cells and the anode catalyst prepared therewith. In one embodiment the present invention provides a process for preparing a supported platinum-ruthenium catalyst on a powdered support material, said process comprising:

a. suspending the support material in water to form a suspension;

b. heating the suspension at most up to said solution's boiling point;

c. after step b, while maintaining the same temperature and stirring, adding solutions comprised of hexachloroplatinic acid and ruthenium chloride to the suspension;

d. after step c, increasing the pH of the suspension to a value between 6.5 and 10 by adding an alkaline solution in order to precipitate hexachloroplatinic acid and ruthenium chloride in the form of sparingly soluble noble metal compounds;

e. after step d, adding one or more organic carboxylic acids and/or their salts to the suspension, and reducing the precipitated noble metal compounds by adding a reducing agent to form a catalyst; and f. after step e, washing and drying the catalyst.

BRIEF DESCRIPTION OF THE FIGURES

FIG. 1 is a representation of an electrochemical performance of the catalyst prepared according to the invention in example 1 as compared with a conventionally prepared catalyst according to comparison example 1.

FIG. 2 is a representation of a voltage drop due to the introduction of 100 ppm of carbon monoxide into the anode gas stream for the catalyst prepared according to the invention in example 1 as compared with a conventionally prepared catalyst according to comparison example 1.

DETAILED DESCRIPTION

Figure 1:
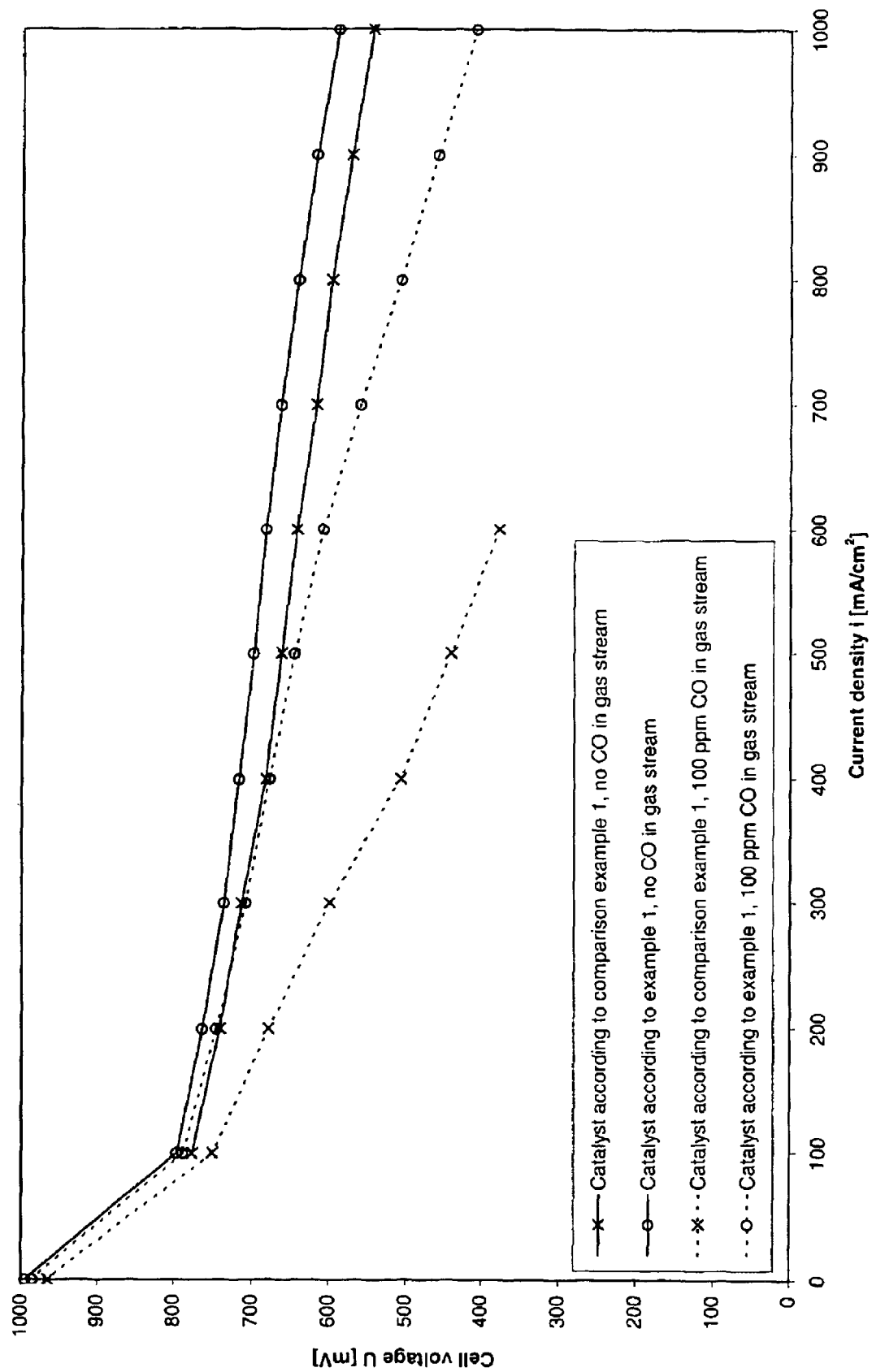
FIG. 1.

For the preparation according to the invention of a platinum-ruthenium catalyst supported on a support in powder form, the support material is suspended in water. The suspension is then heated to 70 to 90° C., preferably with constant stirring. After reaching the desired temperature, aqueous solutions of hexachloroplatinic acid and ruthenium chloride are added to the suspension, the amounts being such as to correspond to the desired loading of the support material with the noble metals. Then the pH of the suspension is increased to a value between 6.5 and 10, by adding an alkaline solution, to precipitate the hexachloroplatinic acid and ruthenium chloride in the form of sparingly soluble noble metal compounds. Then one or more organic carboxylic acids and/or their salts are added to the suspension. Finally, the precipitated noble metal compounds are chemically reduced. The catalyst formed in this way is washed chloride-free, dried and optionally subsequently calcined at a temperature between 300 and 1000° C. under an inert or reducing atmosphere.

This disclosure is not a primer on the prepartion of anode catalysts. Basic concepts known to those skilled in the art have not been set forth in detail.

The suspension of support material, hexachloroplatinic acid and ruthenium chloride is strongly acidic. The noble metal compounds are hydrolysed and precipitated in the form of sparingly soluble, hydroxidic compounds and deposited on the support material by adding an alkaline solution, preferably caustic soda solution. The precipitated noble metal compounds are chemically reduced by adding a reducing agent such as, for example, formaldehyde or hydrazine.

Surprisingly, it has been shown that the quality of the reduction process is substantially improved by adding one or more organic carboxylic acids and/or their salts to the suspension before adding the reducing agent. A catalyst is then obtained in which the ruthenium fraction is present largely in the metallic state. The ruthenium has a high activity for the oxidation of carbon monoxide, an essential prerequisite for a high tolerance to carbon monoxide, due to its metallic state. If the organic carboxylic acid is not added, the ruthenium in the catalyst after completion of the reduction process still has a much higher oxidation state.

Suitable carboxylic acids that exert the observed positive effect are any aliphatic and aromatic carboxylic acids, for example tartaric acid, phthalic acid, acetic acid, citric acid and others. Their salts may also be used, mixed with the acids or on their own. The alkali and alkaline earth metal salts of the carboxylic acids mentioned are particularly suitable.

Carbon blacks, graphitised carbon blacks, graphites, active carbons or conductive inorganic oxides with specific surface areas (BET surface areas measured according to DIN 66132) of about 30 to 1500 m$^2$/g are preferably used as support materials for the catalysts. If the catalyst is intended for use in fuel cells, then a highly electrically conductive support material is chosen.

After reduction, the catalyst is filtered off, washed chloride-free and dried. For many areas of application, it may be used in this condition. For use of the catalyst as an anode catalyst for PEM fuel cells, it has proven advantageous to calcine the catalyst afterwards under an inert or reducing atmosphere at temperatures between 300 and 1000° C.

The process described can also be performed in the same way without using a support material. Precipitation of the noble metal compounds then takes place in volumes of solvent and leads, after reduction, to an unsupported powdered catalyst, a so-called precious metal black. In this case subsequent calcination is not required.

The process according to the invention is characterised not only in that the catalyst obtained therewith is especially tolerant to poisoning by carbon monoxide, but it is substantially more environmentally friendly than some of the processes known from the prior art (for example the ADAMS molten salt process).

For good tolerance to poisoning by carbon monoxide, the atomic ratio of platinum to ruthenium in the catalyst should be adjusted to a value between 4:1 and 1:4, preferably a value of 1:1. In the case of the supported variant, the proportion of platinum and ruthenium, with respect to the total weight of catalyst, can be chosen to be between 10 and 80 wt.-%.

Further tests on the catalyst prepared by the process have shown that its positive, application-oriented properties are also expressed in its microscopic properties. In fact, tests using the method of photoelectron spectroscopy (XPS) have shown that the ruthenium in the catalyst has a bonding energy in the range 280 to 280.7 eV, and thus, is present mainly in the metallic state.

Photoelectron spectroscopy (XPS/ESCA) is a surface-sensitive analytical method. Evaluation of the spectra is based on DIN specialist report no. 39, the report DMA(A)97 from the National Physics Laboratory, Teddington, UK and the previous findings of the working committee "Oberflächen- und Mikrobereichsanalysen NMP816 (DIN)." An instrument from the Leybold Co., model LHS12 with energy analyser EA11A, is used for the tests.

To determine the surface properties of the platinum-ruthenium catalyst, the bonding energies (measured in electron volts, eV) of ruthenium are observed, wherein the Ru 3d 5/2 peak is detected. The lower the degree of oxidation, that is the more metallic the ruthenium becomes, the lower is the value for the bonding energy. The following reference data for the Ru 3d 5/2 peak are used (see Practical Surface Analysis, Second Edition, Volume 1, published by John Wiley and Sons, New York, page 612):

| Ru metallic | (oxidation state 0): | 279.9–280.2 eV |
|---|---|---|
| Ruthenium dioxide | (oxidation state 4): | 280.9 eV |
| Ruthenium trioxide | (oxidation state 6): | 282.5 eV |
| Ruthenium tetroxide | (oxidation state 8): | 283.3 eV |

During measurement, the catalysts are tested in the original state and optionally after erosion of the uppermost surface atoms by argon ions ("sputtering"). The values for bonding energies at the signal maxima are given in eV.

Surprisingly, it is shown that the ruthenium in platinum-ruthenium catalysts prepared by the process according to the invention is largely present in the metallic state and has a bonding energy, measured by XPS, in the range 280.0 to 280.7 eV (Ru 3d 5/2 peak). Corresponding data are provided in the examples.

One possible explanation for the positive properties of the catalysts prepared by the process according to the invention could be that the surface composition and/or the nature of the metal particles is affected by possible buffering of the pH during reduction.

The catalyst according to the invention is preferably used as an anode catalyst for PEM fuel cells. In this application, it has a high tolerance to carbon monoxide, in particular when there is a small or zero air-bleed in the anode gas.

Furthermore, it may be used as an anode catalyst in the supported or unsupported form in direct methanol fuel cells (DMFC).

Having now generally described the invention, the same may be more readily understood through the following reference to the following examples, which are provided by way of illustration and are not intended to limit the present invention unless specified.

EXAMPLES

Example 1

30 g of carbon black (Vulcan XC 72) were suspended in 1.5 l of fully deionised water (VE water) for 30 minutes at room temperature. 52.7 g of 25% strength hexachloroplatinic (IV) acid and 29.4 g of 23.2% strength ruthenium (III) chloride solution were diluted to 300 ml with fully deionised water (VE water) and added to the suspension. The suspension was heated to 80° C. Then the pH was increased to 7.0 using caustic soda solution.

After intensive stirring, 320 ml of dipotassium tartrate hemihydrate solution (Merck, Darmstadt, concentration 0.1 mol/l) were added to the suspension. The pH was kept constant by the further addition of caustic soda solution. Then 56 ml of 24% strength hydrazine solution were added and the suspension was stirred again. Then the catalyst was filtered off and dried at elevated temperature. Finally, the catalyst was calcined at 500° C. under nitrogen.

The final catalyst had a noble metal loading of 40 wt.-%, with respect to the total weight, and an atomic ratio Pt/Ru of 1:1. Characterisation of the catalyst using XRD and XPS gave the following values:

| Particle size (XRD) after calcination: | 5.7 nm |
|---|---|
| XPS bonding energy (signal 3d 5/2) | 280.7 eV |
| Original state: | |
| The Ru was present largely in the metallic state. | |

Comparison Example 1

Example 1 was repeated, but this time no dipotassium tartrate hemihydrate solution was added to the suspension before reduction.

Characterisation of the catalyst using XRD and XPS gave the following values:

| | |
|---|---|
| Particle size (XRD): after calcination: | 7.8 nm |
| XPS bonding energy (Signal 3d 5/2) | 281.3 eV |
| Original state: | |
| The Ru is thus present in an oxidic state (oxidation state >4). | |

Comparison Example 2

A commercially obtainable electrocatalyst from the E-TEK, Division of DeNora N.A. Inc., 39 Veronica Avenue, Somerset N.J. 08873-6800 (USA) was used. This catalyst, according to data in the catalogue, consists of 40 wt.-% platinum-ruthenium on Vulcan XC 72. The atomic ratio Pt/Ru is 1:1.

XPS tests provided the following results:

| XPS bonding energy (Signal 3d 5/2) | |
|---|---|
| Original state: | 282.3 eV |
| After sputtering: | 282.3 eV |

Analysis showed that considerable proportions of oxidic ruthenium (oxidation state about 6) are present on the surface and in the interior of the catalyst. Accordingly, the CO tolerance of this catalyst is reduced.

Example 2

To prepare a catalyst with a noble metal loading of 60 wt.-%, example 1 was repeated, but only 13.3 g of carbon black were suspended in water in order to obtain a higher loading.

The final catalyst had a noble metal loading of 60 wt.-%, with respect to the total weight, and an atomic ratio Pt/Ru of 1:1. Characterisation of the catalyst using XRD and XPS gave the following values:

| | |
|---|---|
| Particle size (XRD) after calcination: | 6.7 nm |
| XPS bonding energy (Signal 3d 5/2) | |
| Original state | 280.2 eV |
| After sputtering | 280.2 eV |
| Thus, the Ru is present in a metallic state. | |

Example 3

To prepare an unsupported platinum-ruthenium catalyst (platinum-ruthenium black), the following procedure was used:

52.7 g of 25% strength hexachloroplatinic(IV) acid and 29.4 g of 23.2% strength ruthenium (III) chloride solution were added to 1.8 l of fully deionised water (VE water) and the solution was heated to 80° C. Then, the pH was increased to 7.0 using caustic soda solution.

After intensive stirring for a period of 1.5 hours, 320 ml of dipotassium tartrate hemihydrate solution (Merck, Darmstadt, concentration 0.1 mol/l) were added. The pH was kept constant by the further addition of caustic soda solution. Then 56 ml of 24% strength hydrazine solution were added and the suspension was stirred further. Then the catalyst was filtered off and dried at elevated temperature.

Characterisation of the catalyst using XPS and XRD gave the following values:

| | |
|---|---|
| Particle size (XRD): | 5.2 nm |
| XPS bonding energy (Signal 3d 5/2) | 280.4 eV |
| Original state | |
| Thus, the Ru was present largely in the metallic state. | |

Application Examples

The catalysts from the preceding examples were each processed to produce an ink using a solution of NAFION® and applied in this form to a proton-conducting membrane. The membrane electrode assembly (MEA) prepared in this way was then measured electrochemically. The gas composition on the anode side was 25 vol. % carbon dioxide, 15 vol. % nitrogen and 60 vol. % hydrogen. Air was used as the cathode gas. The pressure was 3 bar.

FIG. 1 gives the electrochemical performance of the catalysts (cell voltage U as a function of the current density i) from example 1 and comparison example 1. It can be seen that a higher performance is achieved with the catalyst prepared according to the invention. This applies both to the performance without carbon monoxide in the anode gas stream and also to the performance with a carbon monoxide-containing anode gas (100 ppm CO, without an air-bleed).

Figure 2:
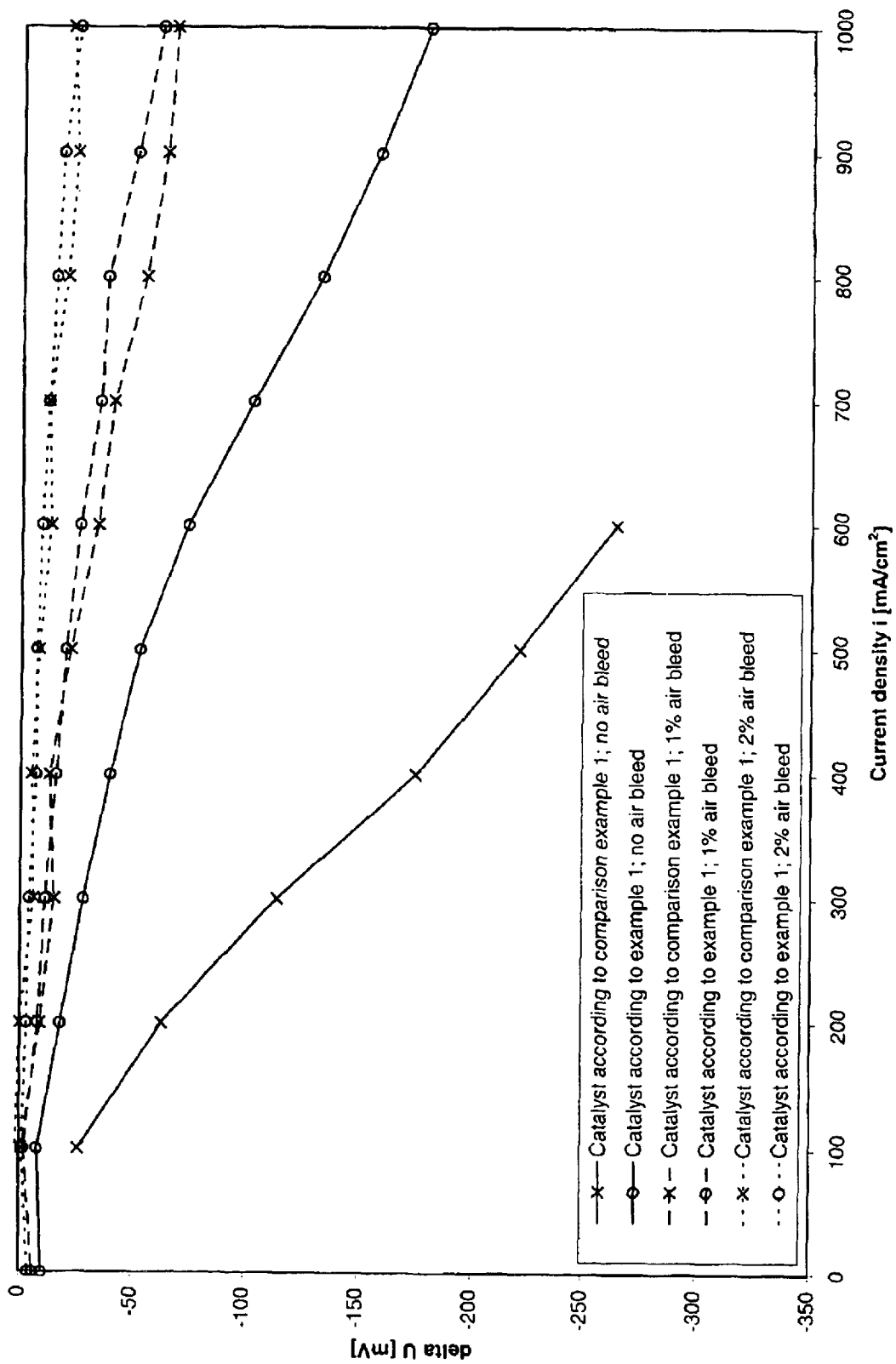
FIG. 2.

FIG. 2 shows the voltage drop $\Delta U$ for the catalysts from example 1 and comparison example 1 due to a carbon monoxide content in the anode gas of 100 ppm as compared with a carbon monoxide-free anode gas with various values for the air-bleed. Here, the better carbon monoxide tolerance of the catalyst prepared according to the invention is shown in comparison with a conventionally prepared catalyst. This is particularly clear at reduced or zero air-bleeds.

What is claimed is:

1. A process for preparing a supported platinum-ruthenium catalyst on a powdered support material, comprising:
   a. suspending the support material in water to form a suspension;
   b. heating the suspension at most up to said suspension's boiling point;
   c. after step b, while maintaining the same temperature and stirring, adding solutions of hexachloroplatinic acid and ruthenium chloride to the suspension;
   d. after step c, increasing the pH of the suspension to a value between 6.5 and 10 by adding an alkaline solution in order or precipitate hexachloroplatinic acid and ruthenium chloride in the form of sparingly soluble noble metal compounds;
   e. after step d, adding one or more organic carboxylic acids and/or their salts to the suspension, and reducing the precipitated noble metal compounds by adding a reducing agent to form a catalyst; and
   f. after step e, washing and drying the catalyst.

2. A process according to claim 1 further comprising calcining the catalyst in step f at a temperature between 300 and 1000 C under an inert or reducing atmosphere after it has been washed and dried.

3. A process according to claim 1, where said support material is selected from the group consisting of carbon black, graphitized carbon black, graphite, active carbon and conductive inorganic oxides.

4. A process according to claim 1, wherein the pH of the suspension is increased by addition caustic soda solution.

5. A process according to claim 1, where the organic carboxylic acid is selected from the groups consisting of tartaric acid, phthalic acid, acetic acid, citric acid and their salts, and mixture thereof.

6. A process according to claim 1, wherein chemical reduction is performed by adding a substance selected from the groups consisting of formaldehyde, hydrazine, and sodium borohydride.

7. A process according to claim 1, wherein the proportion of platinum and ruthenium, with respect to the total weight of catalyst, is between 10 and 80 wt. %.

8. A process according to claim 1, wherein the atomic ratio of platinum to ruthenium is adjusted to a value between 4:1 and 1:4.

9. A process for preparing an unsupported platinum-ruthenium catalyst comprising:
   a. Heating a solution comprised of hexachloroplatinic acid and ruthenium chloride to a maximum of said solution's boiling point; *
   b. increasing the pH of the solution to a value between 6.5 and 10 by adding an alkaline solution in order to precipitate hexachloroplatinic-acid and ruthenium chloride in the form of sparingly soluble noble metal compounds;
   c. adding one or more organic carboxylic acids and/or their salts and reducing the precipitated noble metal compounds to form a catalyst; and
   d. washing and drying the catalyst.

10. A platinum-ruthenium catalyst for fuel cells that comprises platinum and ruthenium in the form of finely divided noble metal particles having an average particle size in the range of 5.2 to 6.7 nm, wherein the ruthenium has a bonding energy, measured by photoelectron spectroscopy (XPS), in the range 280 to 280.7 eV (Ru 3d 5/2 peak) and is largely present in the metallic state.

11. A platinum-ruthenium catalyst according to claim 10, wherein the finely divided noble metal particles are deposited on a powdered support material selected from the group consisting of carbon blacks, graphitized carbon blacks, graphites, active carbons and conductive inorganic oxides.

12. A platinum-ruthenium catalyst according to claim 10, wherein the finely divided noble metal particles are present in an unsupported state.

13. A platinum-ruthenium catalyst according to claim 10, wherein the atomic ratio of platinum to ruthenium is between 4:1 and 1:4.

14. A process for preparing a platinum-ruthenium catalyst on a powdered support material, comprising:
   a. forming an aqueous suspension of the powdered support material;
   b. heating the aqueous suspension at most up to said aqueous suspension's boiling point;
   c. after step b, adding solutions of hexachlorplatinic acid and ruthenium chloride to the aqueous suspension;
   d. after step c, increasing the pH of the aqueous suspension to 6.5–10 in order to form sparingly soluble noble metal compounds;
   e. after step d, adding one or more organic carboxylic acids and/or their salts to the suspension, and reducing the sparingly soluble noble metal compounds by adding a reducing agent to form a catalyst; and
   e. after step e, washing and drying the catalyst.

* * * * *